(12) United States Patent
DeBerry et al.

(10) Patent No.: US 6,818,194 B2
(45) Date of Patent: Nov. 16, 2004

(54) PROCESS FOR REMOVING HYDROGEN SULFIDE FROM GAS STREAMS WHICH INCLUDE OR ARE SUPPLEMENTED WITH SULFUR DIOXIDE, BY SCRUBBING WITH A NONAQUEOUS SORBENT

(75) Inventors: David W. DeBerry, Austin, TX (US); Dennis Dalrymple, Georgetown, TX (US); Kevin S. Fisher, Georgetown, TX (US)

(73) Assignee: CrystaTech, Inc., Austin, TX (US)

( * ) Notice: Subject to any disclaimer, the term of this patent is extended or adjusted under 35 U.S.C. 154(b) by 0 days.

(21) Appl. No.: 10/190,448

(22) Filed: Jul. 5, 2002

(65) Prior Publication Data

US 2003/0021744 A1 Jan. 30, 2003

Related U.S. Application Data

(63) Continuation-in-part of application No. 09/503,898, filed on Feb. 15, 2000, now Pat. No. 6,416,729.
(60) Provisional application No. 60/120,390, filed on Feb. 17, 1999, and provisional application No. 60/156,545, filed on Sep. 29, 1999.

(51) Int. Cl.[7] .............................................. C01B 17/05
(52) U.S. Cl. ....................... 423/228; 423/220; 423/222; 423/578.4
(58) Field of Search .......................... 423/574.1, 573.1, 423/575, 576.2, 576.7, 228, 222, 220, 578.4

(56) References Cited

U.S. PATENT DOCUMENTS

| 927,342 | A | * | 7/1909 | Feld et al. ................ 423/574.1 |
| 2,094,939 | A | * | 10/1937 | Boulogne ..................... 23/224 |
| 2,251,216 | A | * | 7/1941 | Woodhouse ..................... 23/2 |
| 2,534,063 | A | * | 12/1950 | Ross et al. ..................... 23/225 |
| 2,881,047 | A | * | 4/1959 | Townsend ........................ 23/3 |
| 2,998,304 | A | * | 8/1961 | Urban et al. ................... 23/225 |
| 3,023,088 | A | * | 2/1962 | Urban et al. ................... 23/226 |
| 3,103,411 | A | * | 9/1963 | Fuchs ............................ 23/2 |

(List continued on next page.)

FOREIGN PATENT DOCUMENTS

| DE | 2108282 | * | 8/1972 | .......... C01B/17/04 |
| EP | 0565316 A2 | * | 10/1993 | .......... B01D/53/34 |
| FR | 2358186 A | * | 3/1978 | .......... B01D/53/34 |
| GB | 1223732 A | * | 3/1971 | .......... C01B/17/04 |
| WO | WO 98/04337 A | * | 2/1998 | .......... B01D/53/52 |
| WO | WO 99/24531 A | * | 5/1999 | ............ C10L/3/10 |

OTHER PUBLICATIONS

Kohl et al. Gas Purification 4th Edition Gulf Publishing Co. Houston TX USA, ISBN 0–87201–314–6, p. 539, (1985).*

*Primary Examiner*—Wayne A. Langel
(74) *Attorney, Agent, or Firm*—Klauber & Jackson (57) ABSTRACT

A process for removing $H_2S$ from a gaseous stream, wherein the gaseous stream is flowed through an absorber vessel where the stream is contacted with a sorbing liquor comprising a nonaqueous solvent containing dissolved sulfur, a tertiary amine base having sufficient strength and concentration to drive the reaction between $H_2S$ sorbed by the liquor and the dissolved sulfur to form a nonvolatile polysulfide which is soluble in the sorbing liquor, and a solubilizing agent for maintaining the solubility of polysulfide intermediates which may otherwise separate. The dissolved nonvolatile polysulfide in the sorbing liquor is converted to sulfur which remains dissolved in the liquor by contacting the liquor with oxidizing sulfur dioxide. The sorbing liquor following the oxidation of the polysulfide is cooled to a temperature at which the liquor is at or above saturation with respect to the dissolved sulfur. At least part of the dissolved sulfur in the saturated liquor is converted to solid particulate sulfur at a point downstream of the absorber vessel, and the solid sulfur is separated from the liquor.

15 Claims, 10 Drawing Sheets

U.S. PATENT DOCUMENTS

| | | | | |
|---|---|---|---|---|
| 3,363,989 A | * | 1/1968 | Deal, Jr. et al. | 23/225 |
| 3,875,295 A | * | 4/1975 | Barthel et al. | 423/575 |
| 4,097,585 A | * | 6/1978 | Fischer | 423/574 R |
| 4,539,189 A | * | 9/1985 | Starkston et al. | 423/220 |
| 4,647,397 A | * | 3/1987 | Starkston et al. | 252/189 |
| 4,855,124 A | * | 8/1989 | Matsuoka et al. | 423/574 L |
| 4,919,914 A | * | 4/1990 | Smith et al. | 423/576.2 |
| 4,976,635 A | * | 12/1990 | Gottardo et al. | 439/849 |
| 5,202,107 A | * | 4/1993 | Kvasnikoff et al. | 423/574 R |
| 5,389,351 A | * | 2/1995 | Hasebe et al. | 423/242.1 |
| 5,648,054 A | * | 7/1997 | DeBerry | 423/226 |
| 5,730,784 A | * | 3/1998 | Smith | 95/181 |
| 5,733,516 A | * | 3/1998 | DeBerry | 423/220 |
| 5,738,834 A | * | 4/1998 | DeBerry | 422/177 |
| 6,416,729 B1 | | 7/2002 | DeBerry et al. | 423/573.1 |
| 6,544,492 B1 | * | 4/2003 | DeBerry | 423/573.1 |

* cited by examiner

PROCESS FOR REMOVING HYDROGEN SULFIDE FROM GAS STREAMS WHICH INCLUDE OR ARE SUPPLEMENTED WITH SULFUR DIOXIDE, BY SCRUBBING WITH A NONAQUEOUS SORBENT

RELATED APPLICATIONS

This application is a continuation-in-part of application Ser. No. 09/503,898, filed Feb. 15, 2000, now U.S. Pat. No. 6,416,729; and Applicant claims the benefit of its U.S. Provisional Application Nos. 60/120,390 filed Feb. 17, 1999 and 60/156,545 filed Sep. 29, 1999.

FIELD OF INVENTION

This invention relates generally to processes and systems for removing hydrogen sulfide from a gaseous stream. More specifically the invention relates to improvements in a known process and system wherein hydrogen sulfide is removed from a gaseous stream, using a nonaqueous scrubbing liquor in which are dissolved sulfur and a reaction-promoting amine base. In a first aspect of the invention sulfur dioxide is added as an oxidizing gas to the sulfur-amine nonaqueous sorbent (or advantage is taken of $SO_2$ which may already be present in the gas stream) to obtain better $H_2S$ removal, lower chemical degradation rates, and lower rates of formation of byproduct sulfur salts. In a further aspect of the invention the gas to be treated is mixed with oxygen and passed through an oxidation catalyst reactor to either effect oxidation of part of the $H_2S$ to form the required amount $SO_2$ for reaction with the remaining $H_2S$, or to effect partial oxidation of the $H_2S$ in the feed gas to form elemental sulfur, or to form various combinations of products as desired for the application, prior to scrubbing with the nonaqueous solvent.

DESCRIPTION OF PRIOR ART

Conventional liquid redox sulfur recovery processes use a redox couple dissolved in water to scrub hydrogen sulfide from a gas stream and convert it to sulfur. The redox agent is reduced by the hydrogen sulfide and then is regenerated by contacting with air in a separate vessel. One of the main problems with such processes is dealing with the solid sulfur product, which is formed in an uncontrolled manner. The sulfur formed from aqueous solution is notorious for plugging the absorber or other vessels which it passes through, and it is generally hard to separate and handle. Sulfur formed from nonaqueous solvents has much better handling properties. However, most nonaqueous redox systems have certain disadvantages such as sluggish sulfur formation kinetics or difficulties in regenerating the sorbent with air. In aqueous systems, contact of polysulfides with air primarily produces sulfates and other undesired sulfur oxyanion byproducts which are difficult to purge from the system.

The present inventor's U.S. Pat. No. 5,738,834, the entire disclosure of which is hereby incorporated by reference, discloses a process which uses a sulfur-amine nonaqueous sorbent (SANS) and operating conditions under which sulfur itself can convert hydrogen sulfide to polysulfides which are nonvolatile but which can be readily transformed to sulfur by reaction with an oxidizing agent. This is done in a solvent with a high solubility for sulfur so that solid sulfur formation does not occur in the absorber or in the air-sparged regenerator. Solid sulfur formation can be initiated in process equipment designed to handle solids and can be done under well-controlled conditions. In the SANS process, the sour gas is fed to an absorber (typically countercurrent) where the $H_2S$ is removed from the gas by a nonaqueous liquid sorbing liquor which comprises an organic solvent for elemental sulfur, dissolved elemental sulfur, an organic base which drives the reaction converting $H_2S$ sorbed by the liquor to a nonvolatile polysulfide which is soluble in the sorbing liquor, and an organic solubilizing agent which prevents the formation of polysulfide oil—which can tend to separate into a separate viscous liquid layer if allowed to form. The solubilizing agent is typically selected from the group consisting of aromatic alcohols and ethers including alkylarylpolyether alcohol, benzyl alcohol, phenethyl alcohol, 1-phenoxy-2-propanol, 2-phenoxyethanol, alkyl ethers including tri(propylene glycol) butyl ether, tri(propylene glycol) methyl ether, di(ethylene glycol) methyl ether, tri(ethylene glycol) dimethyl ether, benzhydrol, glycols such as tri(ethylene) glycol, and other polar organic compounds including sulfolane, propylene carbonate, and tributyl phosphate, and mixtures thereof. The sorbing liquor is preferably essentially water insoluble as this offers advantages where water may be condensed in the process. It is also preferable for water to be essentially insoluble in the solvent. The nonaqueous solvent is typically selected from the group consisting of alkyl-substituted naphthalenes, diaryl alkanes including phenylxylyl ethanes such as phenyl-o-xylylethane, phenyl tolyl ethanes, phenyl naphthyl ethanes, phenyl aryl alkanes, dibenzyl ether, diphenyl ether, partially hydrogenated terphenyls, partially hydrogenated diphenyl ethanes, partially hydrogenated naphthalenes, and mixtures thereof. In order to obtain a measurable conversion of sulfur and hydrogen sulfide to polysulfides, the base added to the solvent must be sufficiently strong and have sufficient concentration to drive the reaction of sulfur and hydrogen sulfide to form polysulfides. Most tertiary amines are suitable bases for this use. More particularly, tertiary amines including N,N imethyloctylamine, N,N dimethyldecylamine, N,N dimethyldodecylamine, N,N dimethyltetradecylamine, N,N dimethylhexadecylamine, N-methyldicyclohexylamine, tri-n-butylamine, tetrabutylhexamethylenediamine, N-ethylpiperidine hexyl ether, 1-piperidineethanol, N-methyldiethanolamine, 2-(dibutylamino)ethanol, and mixtures thereof are suitable for use in the said process. It should be noted that while the solvent utilized in the process requires the addition of a base to promote the reaction of sulfur and hydrogen sulfide to form polysulfides, the base and the solvent may be the same compound.

As it is removed, the $H_2S$ thus reacts with elemental sulfur and a tertiary amine, both dissolved in the sorbent, to form an amine polysulfide. One of the polysulfide-formation reactions in the absorber may be depicted as follows (where B stands for the amine, HB$^+$ is the protonated amine, g denotes the gas phase, and l denotes the liquid phase).

$$H_2S(g) + S_8(l) + 2B(l) \leftrightarrows (HB)_2S_9(l) \quad (1)$$

The stoichiometry shown in this equation is representative, although polysulfides of other chain lengths may be formed, and varying degrees of association of the amine and polysulfide may occur, depending on the specific solvent chemistry and operating conditions. The primary solvent is selected to have a high solubility for sulfur (as well as for the amine) so that the sorbent circulation rates can be low, producing small equipment sizes for both the $H_2S$ absorber and the solution regenerator. Another ingredient is normally added to the sorbent to solubilize the amine polysulfides which might otherwise separate. The sweet gas from the absorber exits the process. The rich sorbent from the absorber may be passed through a reactor to allow further time for polysulfide formation reactions to occur, if desired. The sorbent is flashed down to near atmospheric pressure in one or more stages, producing a small flash gas stream that can either be recycled or used as fuel for local power generation. The sorbent is then contacted with an oxidizing gas such as air in the regenerator to oxidize the polysulfide to elemental sulfur, which remains dissolved in the solvent. This reaction, which also frees the amine for the next sorption cycle, can be depicted as follows.

$$(HB)_2S_9(l) + \tfrac{1}{2}O_2(g) \rightleftharpoons S_8(l) + H_2O(g) + 2B(l) \qquad (2)$$

Under the proper chemical and physical conditions, the efficiencies for simple air regeneration are unexpectedly high and the rates of the air oxidation reaction to sulfur are unexpectedly fast for a nonaqueous system. Tertiary amines produce high regeneration efficiencies. Spent air from the oxidizer contains the product water. The sorbent stream from the oxidizer is cooled in a heat exchanger and fed to the crystallizer where the cooling causes the formation of crystalline sulfur. The sorbent is cooled to a sufficiently low temperature to crystallize enough solid sulfur to balance the amount of hydrogen sulfide absorbed in the absorber. This produces the same overall reaction as in other liquid redox sulfur recovery processes.

$$H_2S(g) + \tfrac{1}{2}O_2 \rightleftharpoons \tfrac{1}{8}S_8(s) + H_2O(g) \qquad (3)$$

The solvent generally can have a solubility for sulfur in the range of from about 0.05 to 2.5, and in some instances as high as 3.0 g-moles of sulfur per liter of solution. The temperature of the nonaqueous solvent material is preferably in the range of about 15° C. to 70° C. Sulfur formation is obtained, when desired, by cooling the liquor proceeding from the air-sparged regenerator. This can for example be effected at a sulfur recovery station by cooling means present at the station. The solvent is thereby cooled to a sufficiently low temperature to crystallize enough solid sulfur to balance the amount of hydrogen sulfide absorbed in the absorber. The solubility of elemental sulfur increases with increasing temperature in many organic solvents. The rate of change of solubility with temperature is similar for many solvents, but the absolute solubility of sulfur varies greatly from solvent to solvent. The temperature change necessary to operate the process will vary primarily with the composition of the sorbent, the flow rate of sorbent, and the operating characteristics of the recovery station. Although greater temperature drops can be used, for most applications, a temperature difference of 5° C. to 30° C. is appropriate as between the temperature of the solvent material at the absorber/reactor and temperature to which the said solvent is cooled at the sulfur recovery station. The regenerated sorbent from the crystallizer is recycled back to the absorber. The slurry of crystalline sulfur from the crystallizer is thickened and fed to a filter that produces a filter cake of elemental sulfur for disposal or sale.

The reaction between sulfur and $H_2S$ to form polysulfide is chemically reversible and the physical solubility of $H_2S$ in the sorbent is high. The equilibria are such that at low inlet $H_2S$ concentrations it becomes difficult to achieve high $H_2S$ removals at acceptably low liquid flow rates due to the "back-pressure" of $H_2S$.

SUMMARY OF INVENTION

Now in accordance with a first aspect of the present invention, it has been found that in the process of the U.S. Pat. No. 5,738,834, the addition of $SO_2$ to the absorber produces a more complete chemical conversion of $H_2S$ thus reducing the equilibrium back-pressure of $H_2S$ and allowing much better removals to be obtained. The $SO_2$ is thereby used as an or the oxidizing gas referred to in the U.S. Pat. No. 5,738,834. A major reaction appears to be between $SO_2$ and the amine polysulfide formed in the initial SANS reaction:

$$2(HB)_2S_9(l) + SO_2 \rightleftharpoons 19/8 S_8(l) + 2H_2O(g) + 4B(l) \qquad (4)$$

Combining this with equation 1 gives the overall reaction:

$$2H_2S(g) + SO_2(g) \rightleftharpoons \tfrac{3}{8}S_8(l) + 2H_2O(g) \qquad (5)$$

This is the same as the well-known Claus reaction which is usually practiced in the gas phase at elevated temperatures using a catalyst. The gas phase Claus process is highly exothermic and equilibrium limited in the temperature range where it is normally practiced. Many attempts have been made at devising a liquid phase Claus reaction-based $H_2S$ removal process to circumvent the equilibrium limitation. Most of these attempts have been plagued by the sluggish kinetics of the direct low temperature reaction of $H_2S$ and $SO_2$ and by the formation of intractable mixtures of polythionates (Wackenroder's solution) and other undesirable byproducts. Use in the present invention of a hydrophobic solvent having a high sulfur dissolving ability removes these defects. The high concentration of sulfur promotes the formation of polysulfide when reacted with $H_2S$ and the polysulfide reacts rapidly and completely with $SO_2$.

The process can be operated with an excess of $H_2S$ over the classical "Claus" mole ratio of 2 mole $H_2S$ per mole $SO_2$ where air is used as an oxidant in addition to $SO_2$. This is illustrated by Example 1 (see below) which used an input mole ratio of 3 mole $H_2S$ per mole $SO_2$. Under these conditions, reactions (2) and (4) apparently operate in parallel to form the product sulfur. During the 44 hour run under these conditions, the sulfur oxyanion byproduct make rate was only 1.92% (total moles sulfur in oxyanion byproducts per mole sulfur absorbed). This is somewhat lower than the value usually obtained in the SANS process in the absence of $SO_2$, and illustrates that the conventional view that mixtures of sulfur and $SO_2$ necessarily produce a lot of thiosulfate does not apply to the process conditions described here. A significantly lower than normal amine degradation rate of 0.28% (mole amine degraded per mole sulfur absorbed) was also observed in this run. This is to be compared with the value of about 1.0% (mole amine degraded per mole sulfur absorbed) previously observed in runs done with no $SO_2$. This increase in amine stability could be due to the oxidation of polysulfide with $SO_2$ being less harsh and generating less reactive oxidizing intermediates than the oxidation of polysulfide with oxygen.

When operated without any air regeneration, the $SO_2$-enhanced SANS process operates at a nominal $H_2S:SO_2$ mole ratio of 2:1 in accordance with the usual overall Claus reaction. However the sorbent composition, particularly the high elemental sulfur concentration, provides a buffering effect which allows extended operation under "off-ratio" inlet gas conditions. This is important for obtaining stable operation and for meeting environmental regulations which may limit short term peak emissions. During episodes of higher than stoichiometric addition of $SO_2$, the high elemental sulfur concentration in the solution allows the formation of thiosulfate, $$SO_2(l) + \tfrac{1}{8}S_8(l) + 2B(l) + H_2O \rightarrow (HB)_2S_2O_3(l) \qquad (6)$$

which can later be converted to product sulfur by reaction with $H_2S$ or a polysulfide.

$$(HB)_2S_2O_3(l) + 2H_2S(l) \rightarrow \tfrac{1}{2}S_8(l) + 2B(l) + 3H_2O \qquad (7)$$

$$(HB)_2S_2O_3(l) + 2(HB)_2S_9(l) \rightarrow 5/2 S_8(l) + 6B(l) + 3H_2O \qquad (8)$$

Thus the elemental sulfur serves as a redox buffer for both of the main reactants, reacting either with excess $H_2S$ to form polysulfide, or with excess $SO_2$ to form thiosulfate. Importantly, the products of these reactions can then be efficiently converted to elemental sulfur when the $H_2S:SO_2$ ratio swings back the other way, and byproduct formation is minimal.

The process of the foregoing aspect of the present invention can be applied to many different sulfur recovery situations with the addition of $SO_2$ being accomplished by several possible means including (1) obtaining $SO_2$ as a gas or liquid from an independent source and injecting it into the inlet gas or absorber; (2) burning product sulfur and injecting the resultant $SO_2$ as in the (1); and (3) converting a portion of the $H_2S$ or other sulfur species in the inlet gas to $SO_2$ by passing a portion of the inlet gas stream along with air or oxygen through a catalyst bed or other device which will provide the desired amount of $SO_2$.

To summarize, one major advantage of the aforementioned aspect of the invention is that better $H_2S$ removal can be obtained if $SO_2$ is present in the scrubbing liquor or in the inlet due to the more complete chemical reaction of $H_2S$ in the absorber. Another advantage is that the $H_2S$ can conveniently be converted to elemental sulfur in the absorbing vessel, which may be at high pressure, thus minimizing the flashing of $H_2S$ when the liquid is "flashed" down to lower pressures. This property of conversion to sulfur in one vessel also provides the opportunity to maintain the circulating liquid at operating pressure, thus eliminating the flashing of volatile hydrocarbons, as can happen if the liquid pressure is reduced prior to regeneration in an oxidizer operating near ambient pressure. Yet another advantage is the decrease in degradation of amine, apparently due to the less harsh oxidation conditions provided by $SO_2$ compared to oxygen.

In the process of the invention, the sorbing liquor prior to its being cooled can have a temperature up to 85° C. Depending upon its initial temperature the liquor is cooled from about 5° C. to 60° C. In preferable operation the sorbing liquor is cooled from about 5 to 30° C. to enable sulfur precipitation.

In a further aspect of the invention the gas to be treated is mixed with oxygen and passed through an oxidation catalyst reactor to either effect oxidation of part of the $H_2S$ to form the required amount $SO_2$ for reaction with the remaining $H_2S$, or to effect partial oxidation of the $H_2S$ in the feed gas to form elemental sulfur, or to form various combinations of products as desired for the application, prior to scrubbing with the nonaqueous solvent.

In another aspect of the invention, the sorbing liquor following oxidation of the polysulfides to sulfur which remains dissolved in the liquor, is cooled by being pumped through a cooling loop while being in a substantially clear state, bringing the liquor to a condition of supersaturation with respect to the dissolved sulfur, the supersaturated clear liquor being taken from the cooling loop and contacted with seeding crystals of sulfur to effect precipitation of dissolved sulfur. By pumping the liquor through the cooling loop while clear (as opposed to its being in the form of a slurry) relatively simple and inexpensive pumping means can be utilized.

DESCRIPTION OF PREFERRED EMBODIMENTS

The SANS process as described above can be applied to many different sulfur recovery situations with the addition of $SO_2$ to the feed or sour inlet gas, or with $SO_2$ already being present in the inlet sour gas. Certain gas streams of interest will already contain $SO_2$ along with $H_2S$, and in those cases there may be no need to add additional $SO_2$. For these cases it may be desireable to adjust the conditions of the process which generates the gas to obtain the optimum mole ratio of 2:1 ($H_2S : SO_2$). Where such a manipulation of concentrations is not possible various amounts of $SO_2$ can be added to the gas stream by the methods previously described. The SANS process will then remove both $SO_2$ and $H_2S$ to form sulfur according to the overall reaction (5) given above. In practice of the present invention the sorbent liquor used will unless otherwise indicated be comprised of components as has been above described in the referenced U.S. Pat. No. 5,738,834. It is preferable that the sorbent have a low dissolving power for water so that any condensation of liquid water does not contaminate the sorbent in such a way as to necessitate a separate distillation or water stripping step.

Figure 1:
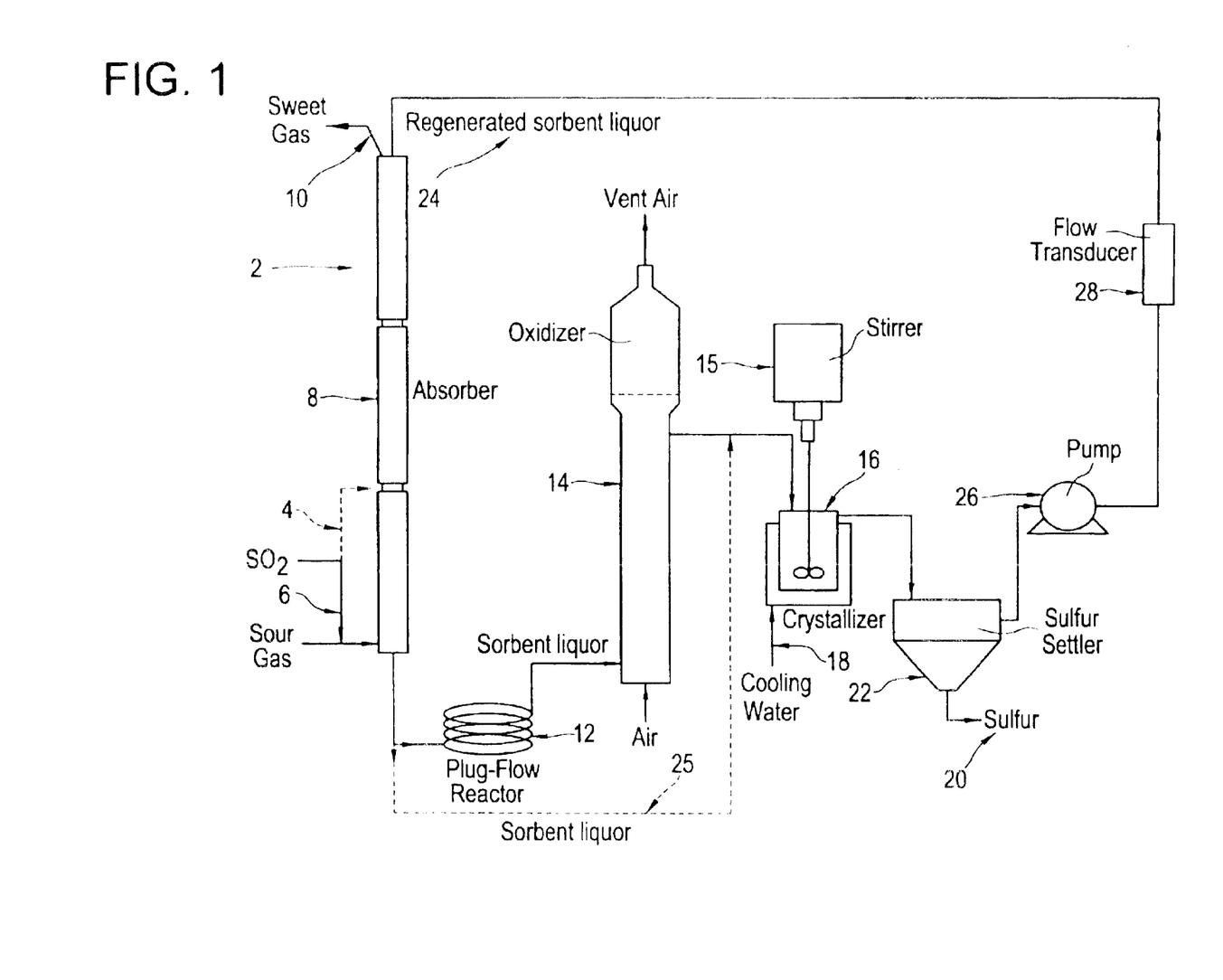
FIG. 1 is a schematic block diagram of a test apparatus operating in accordance with a first embodiment of the present invention.
Figure 2:
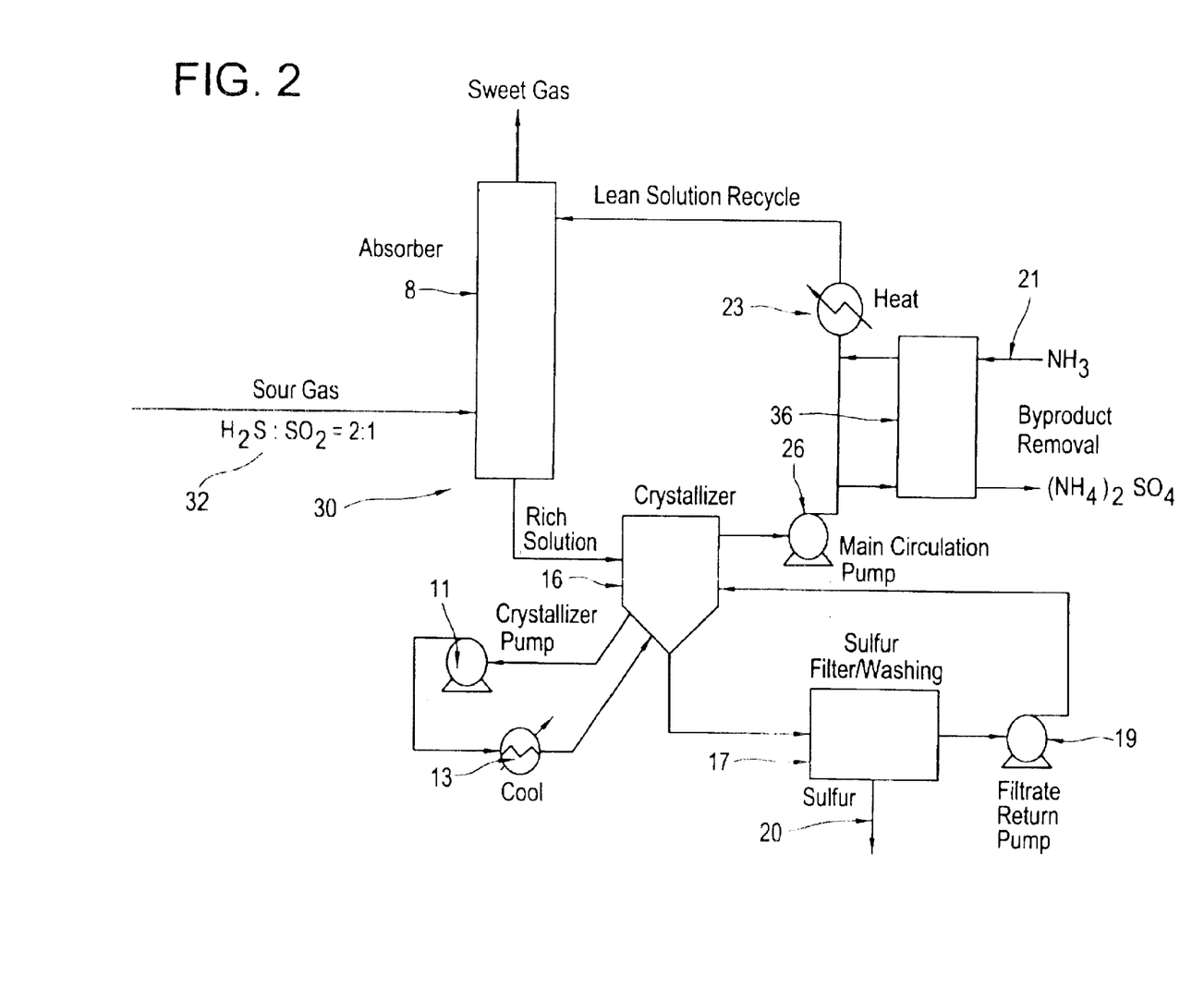
FIG. 2 is a more generalized schematic block diagram depicting the same embodiment in which the $H_2S$ and $SO_2$ are already in the correct ratio.

Similarly, the sorbent components should have a low solubility in water, such that they are not lost to a separate water phase which may be formed by condensation An example of a gas stream which already contains $SO_2$ is the off-gas from the catalyzed gas phase Claus process. In the Claus process, a portion of the $H_2S$ in the sour gas stream is converted to $SO_2$ and the mixture of $H_2S$ and $SO_2$ is passed across a catalyst at elevated temperature to cause the conversion to elemental sulfur. This process is highly exothermic and is equilibrium limited at the elevated temperature, so the off-gas ("Claus tail gas") contains significant amounts of $SO_2$ and $H_2S$. The Claus process can be operated so as to produce the appropriate ratio 2:1 mole ratio of $H_2S:SO_2$ in the tail gas and the SANS process will then remove the remaining $SO_2$ and $H_2S$ from this tail gas. Both the addition of $SO_2$ and the process configuration where $SO_2$ was already present in the input "sour gas" were demonstrated experimentally as depicted in the system 2 schematically shown in FIG. 1. The dashed line 4 represents addition of $SO_2$ to the system at some point other than the inlet. The solid line 6 joins the $H_2S$-containing gas before being admitted to the absorber 8, showing that both were contained in the inlet gas for many of the experimental cases. FIG. 2 is a more general presentation of this case and may be considered simultaneously with FIG. 1.

The input gases proceed upwardly in absorber 8 wherein contact is effected with the downwardly moving sorbing liquor as described in the aforementioned U.S. Pat. No. 5,738,834, with the purified sweetened gas exiting at 10. As otherwise described in the referenced patent, the sorbent liquor and its several components exit absorber 8 and proceed through a plug flow reactor 12 to an oxidizer 14, thence through sulfur crystalizer 16 which is agitated by a stirrer 15 and cooled by cooling water 18. Crystalized sulfur 20 is removed at settler 22, with the regenerated sorbent liquor 24 being passed through a pump 26 and flow measuring transducer 28 before being recycled to absorber 8.

It is to be noted in FIG. 1 that the reactions occurring in absorber 8 are such that the sorbent liquor from the aborber need not pass via the oxidizer 14 as in the U.S. Pat. No. 5,738,834; but instead as shown by dashed line 25 the sorbent flow may proceed directly to the sulfur crystalizer.

In the more generalized showing of FIG. 2, a system 30 is shown in which similar components to those in FIG. 1 are identified with the corresponding reference numerals. It is assumed here that the ratio of $H_2S$ to $SO_2$ in the input gas is at or brought to the classical 2:1 ratio preferred for the Claus reactions, as shown at 32. Several additional details are shown in FIG. 2, such as the loop from crystalizer 16 which includes a crystalizer pump 11 and cooling means 13. Similarly the sulfur removal means is shown as including a sulfur filter and washing means 17 with the filtrate from the latter being recycled via a filtrate pump 19. Also a heater 23 is shown for bringing the recycled sorbent liquor back to the appropriate temperature for the absorber.

A feature has been added to the system 30 which is otherwise disclosed in the present applicant's copending patent application, filed as International Application PCT/US99/16,500, and published on Feb. 3, 2000 as WO 00/05171. As applicable to the system 30, it is found that a small fraction of the removed sulfur-containing gases are converted to sulfur oxyanion byproducts (such as sulfate) rather than to elemental sulfur. Although the fraction is small, if these compounds are not removed they can build up in concentration and cause operating problems or necessitate costly blowdown of the solution. The present sorbent system 30 allows the use of the unique method of the referenced application for removing these unwanted byproducts. The method is based on addition of gaseous ammonia 21 to the process solution. Surprisingly, it has been found that ammonium sulfate in particular is quite insoluble in the nonaqueous SANS solution, in contrast to its high solubility in aqueous solutions. Therefore, bubbling ammonia into a SANS solution containing these salts results in nearly instantaneous formation of solid ammonium sulfate which precipitates from the solution, thereby allowing its removal at separator 36 by settling, filtration, or other common solid/liquid separation methods. The reaction (for sulfate) can be written as follows, with B representing the amine ($HB^+$ is then the protonated amine):

The reactions appear to be essentially quantitative, and since ammonia is quite inexpensive, the removal process is economically favorable. Water-soluble components can be used in the sorbent without losing them to the water wash or using other separation steps to recover them from the wash water of the earlier method. Ammonium thiosulfate is also removed by this method if its concentration is high; however in the present system it can undergo further reaction with $H_2S$ to form elemental sulfur and so its concentration is unlikely to rise to the point where a substantial amount of it is removed by ammonia addition. In general however, sufficient quantities of ammonia are used to bring the concentrations of sulfate and thiosulfate species below a predetermined point, usually to less than 0.05M.

Figure 3:
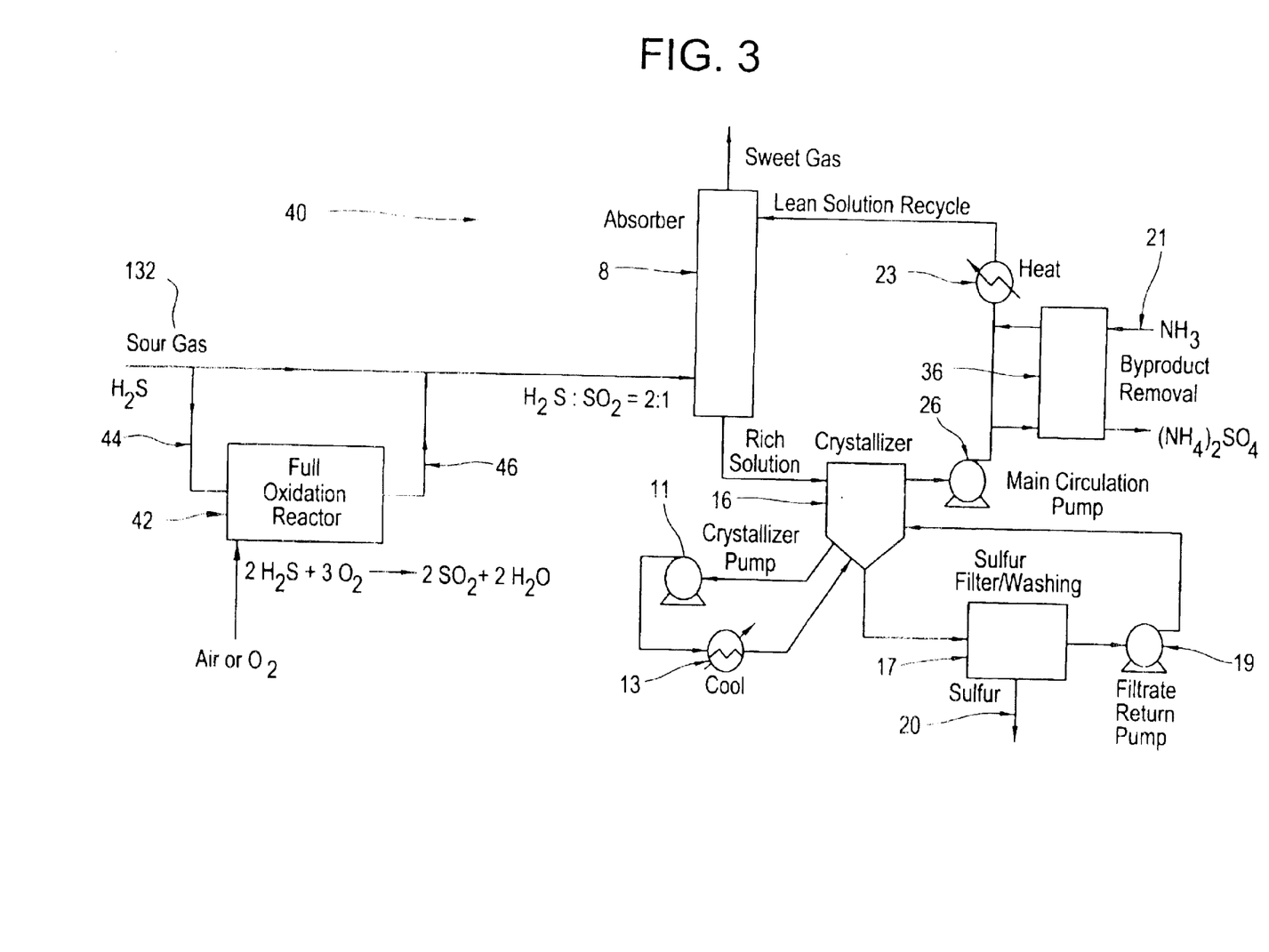
FIG. 3 is a schematic block diagram depicting a second embodiment of the invention, in which full oxidation of a sidestream of the input $H_2S$-laden gas is carried out in a sidestream upstream of the absorber followed by combining with the main inlet stream.

In the system 40 schematically depicted in FIG. 3, a full oxidation catalyst is provided at reactor 42 upstream of the absorber to convert enough $H_2S$ to $SO_2$ to give the desired 2:1 ratio. Here the oxidation catalyst reactor 42 is seen to receive a portion 44 of the input sour gas 32 and effect the desired full oxidation to $SO_2$. The output 46 from the oxidation reactor 42 is then returned to the input stream to absorber 8. The remaining portions of system 40 are as in system 30 of FIG. 2, and corresponding elements are similarly identified.

Gas phase catalytic processes such as Claus and others form elemental sulfur in the gas phase which is normally condensed to liquid form for removal. Complete removal by condensation is expensive, and the tail gases from such processes often contain elemental sulfur vapor which may end up being converted to $SO_2$ when the gas stream is incinerated, producing a source of pollution. The SANS process is useful for removing any such gas phase elemental sulfur, due to the high solubility of elemental sulfur in the SANS sorbent. Thus the SANS process can be effectively used to remove that sulfur as well as any remaining $H_2S$ or $SO_2$ in the tail gas stream. For those cases where $SO_2$ is generated catalytically for mixing with $H_2S$ prior to contacting with the SANS sorbent, it may also be desirable to operate the catalyst such that part of the $H_2S$ is converted to elemental sulfur by the catalyst, since this elemental sulfur can be readily removed by the SANS sorbent followed by crystallization of solid sulfur from sorbent on cooling.

Accordingly, instead of operating the oxidation catalyst reactor in FIG. 3 to effect full oxidation of the $H_2S$, a suitable catalyst and operating conditions can be employed so as to effect a partial oxidation reaction (not illustrated) which converts the $H_2S$ to elemental sulfur which can be partially removed upstream of the absorber as molten sulfur by cooling the gas stream. Where operated as such a partial oxidation reactor, a catalyst can be used which is active and selective for the partial oxidation of $H_2S$ to sulfur. Catalysts and conditions appropriate to this reaction are well known, and references may be had to the disclosures of U.S. Pat. Nos. 4,623,533; 4,857,297; 4,552,7465; and 4,311,683, setting forth details of suitable catalysts and operating conditions which may be used for these purposes—typically temperatures in the range of from about 150 to 400 C. are used The sulfur-laden gas exiting the reactor is conveyed to a sulfur condenser, where most of the sulfur is condensed and exits the process as a molten liquid.

Figure 4:
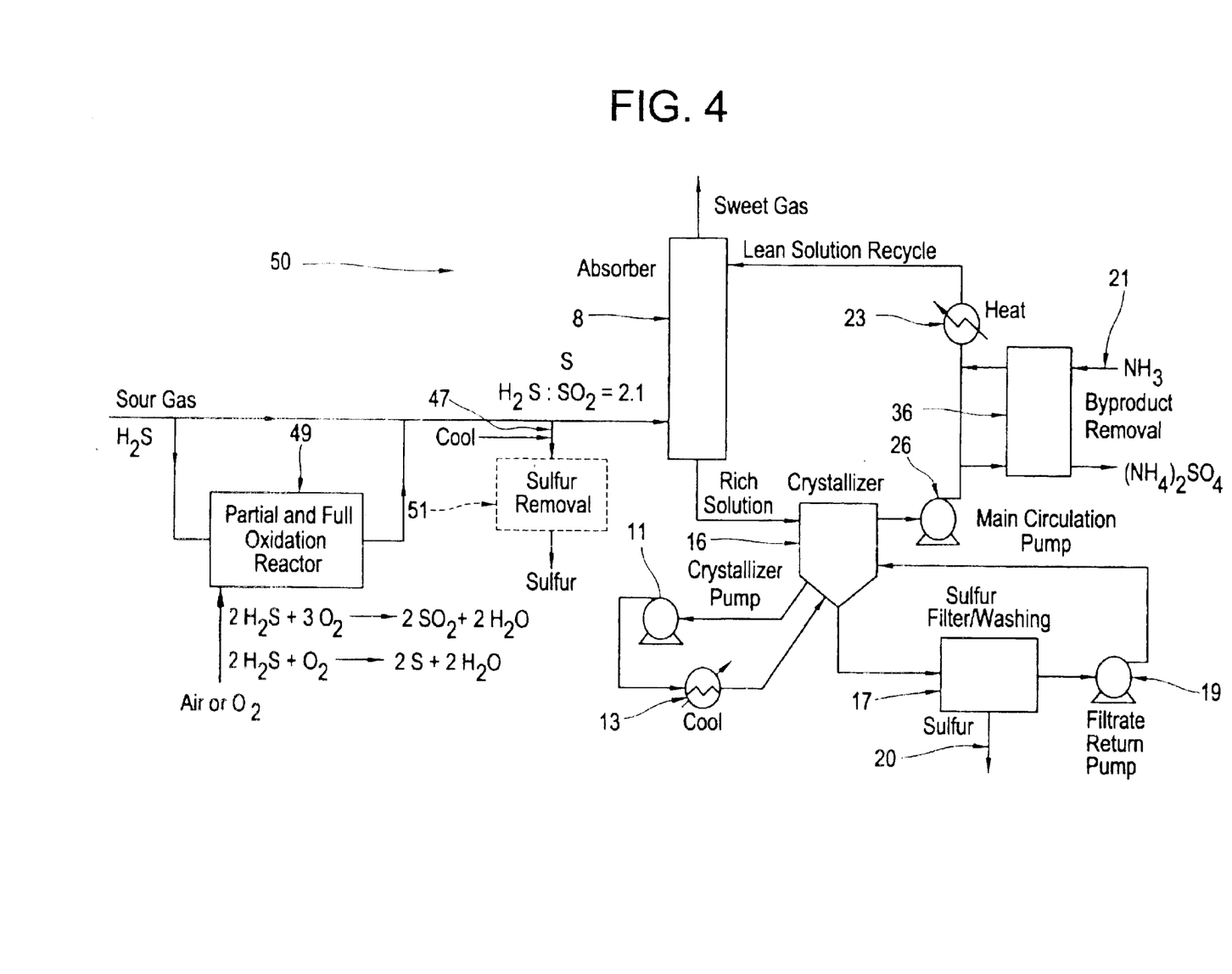
FIG. 4 is a schematic block diagram depicting another embodiment of the invention, in which both partial and full oxidation of the input $H_2S$ are carried out on a sidestream of the inlet gas upstream of the absorber followed by combining with the main inlet stream and treatment in the absorber.

With the type of arrangement depicted in system 50 in FIG. 4 three types of reactions can be brought about upstream of the absorber: conversion of $H_2S$ to $SO_2$; conversion of $H_2S$ to elemental sulfur; and partial conversions of the foregoing character, so that quantities of $H_2S$ can slip through unconverted. All of these variations can occur at the same time depending on the temperatures, the type of catalysts, and the amount of air added at the reactor- ranging from substoichiometric quantities of air to excess air. To enable these several results the full oxidation reactor of FIG. 3 is shown as replaced by a partial and full oxidation reactor 49.

In the arrangement of FIG. 4 it may be desirable to employ suitable catalysts to convert as much of the inlet $H_2S$ to elemental sulfur as possible (which can then be removed at means 51 upstream of the absorber as molten sulfur when the stream is cooled as at 47), and then convert enough of the remaining inlet $H_2S$ to $SO_2$ so that the resultant gas has the desired 2:1 ratio. By maximizing the amount of sulfur produced and removed ahead of the absorber, less sulfur remains for removal at the end of the SANS process which proceeds downstream of the absorber. The crystallization of sulfur is generally more costly to carry out than bulk condensation of sulfur upstream of the absorber gas phase conversion. However, complete condensation of elemental sulfur becomes expensive, and the SANS solvent will be highly effective for removing sulfur vapor. In addition, a practical limit exists respecting the amount of sulfur which can be formed in the upstream gas phase reactor or reactors when the gas is being treated at pressure. This occurs because at high pressure the gas will hold less sulfur than at atmospheric pressure. Accordingly any sulfur formed which is in excess of the amount the gas can hold can condense in the catalytic bed to cause plugging.

Figure 8:
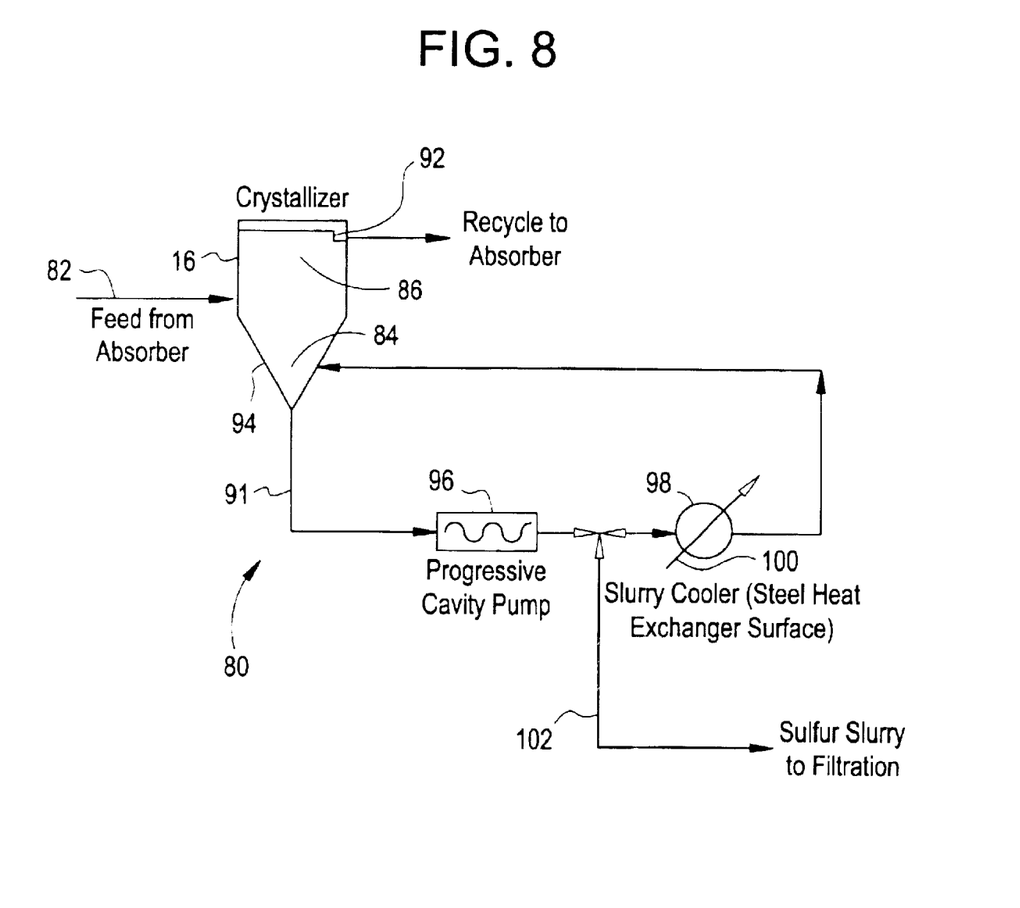
FIG. 8 is a schematic block diagram showing a cooling loop arrangement which may be utilized in the present invention.

FIG. 8 depicts in greater detail a cooling loop 80 which can be used e.g. in the system of FIG. 2. Crystallizer tank 16 receives absorber liquor at 82 which is rich in dissolved sulfur. Tank 16 by virtue of gravitational settling collects precipitating sulfur crystals at its lower region or settling zone 84, while the upper regions or clear zone 86 contains substantially clear absorber liquor. The latter is withdrawn and recycled to the absorber 8. A weir 92 can be used to further facilitate withdrawal of the substantially clear liquor. The cooling loop 80 is provided input feed 91 from at or near the bottom conical portion 94 of tank 16, i.e. from settling zone 84. This feed contains large quantities of sulfur particles, and is accordingly in the form of a slurry. The slurry proceeds through the pump 96 and a heat exchanger 98 cooled by a cooling water stream 100, and then is returned to zone 84 of tank 16. Between pump 96 and heat exchanger 98 a portion 102 of the slurry can be taken for filtration. Since pump 96 is required to pump a slurry, such pump can suitably take the form of a progressive cavity pump or other pump adapted for handling of slurries. The heat exchanger 98 can be of conventional construction, having e.g. steel heat exchanger surfaces. The temperature drop across the heat exchanger is preferably not so high as to cause unduly high sulfur precipitation at the heat exchanger surfaces or elsewhere in the cooling loop, as this can over a period of time cause plugging and necessitate increased servicing. Although higher temperature drops can be utilized, a temperature drop of the order of 5 to 30° C. is typical, with from 5° C. to 10° C. being preferred.

Figure 9:
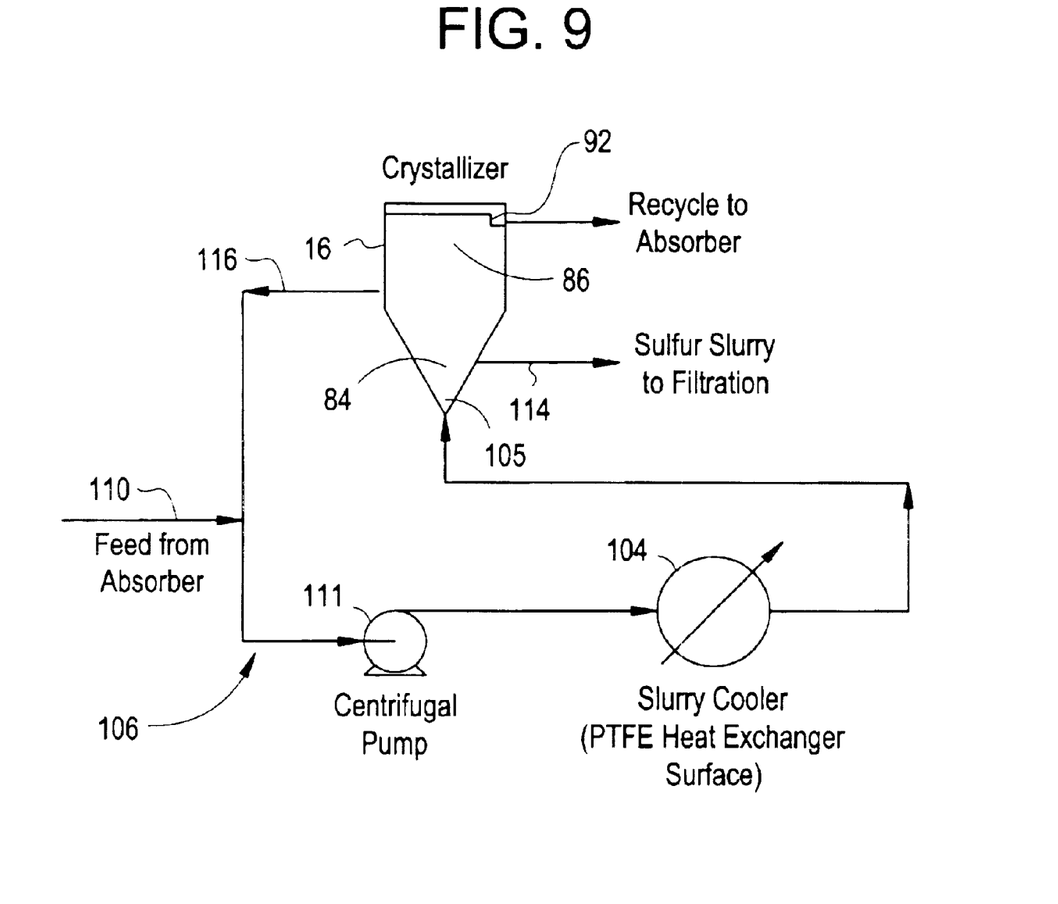
FIG. 9 is a schematic block diagram showing a cooling loop and crystallizer tank arrangement which enables cost and efficiency improvements in the systems of the invention.
Figure 10:
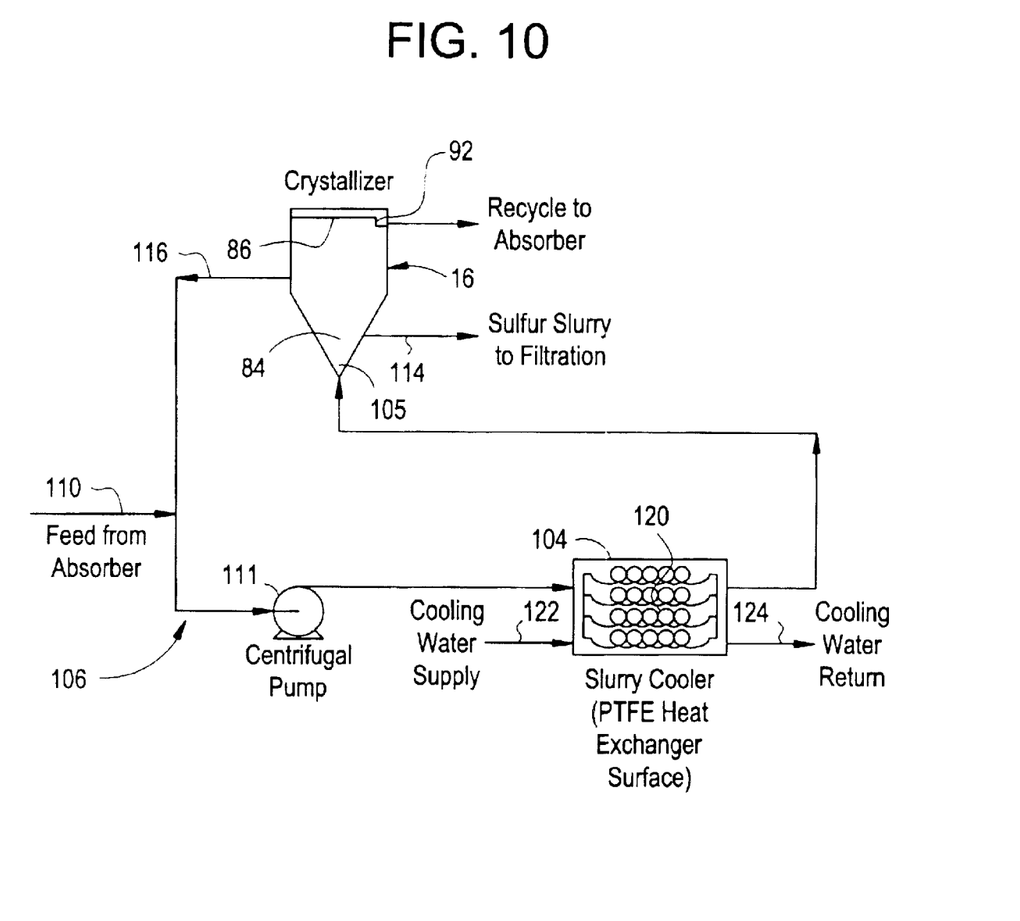
FIG. 10 is a schematic block diagram showing further details of the cooling and crystallization arrangement of FIG. 9.

In FIG. 9, an arrangement for the cooling loop and crystallizer tank is shown which is particularly advantageous for use in the invention. FIG. 10 which shows further details of the heat exchanger 104, may be viewed simultaneously with FIG. 9. The bulk of the feed for cooling loop 106 in this arrangement derives from the upper clear zone 86 of crystallizer tank 16 and is substantially clear. This clear liquor feed 116 is joined at the cooling loop and mixed with feed 110 from absorber 8. The joined feeds are pumped through a pump 111 and heat exchanger 104 before being returned to crystallizer tank 16 at the bottom of same, i.e. at lower settling zone 84. The liquor circulated through loop 106 is substantially clear throughout its circulation through the loop. As the liquor passes through heat exchanger 104 it is cooled below saturation with respect to dissolved sulfur, and although remaining clear becomes supersaturated with respect to the dissolved sulfur. As the liquor then enters at the bottom 105 of crystallizer tank 16 it comes into contact with the sulfur crystals present at settling zone 84. These crystals act to seed the supersaturated liquor to effect precipitation of the dissolved sulfur. The sulfur slurry is taken from settling zone 84 at 114 for filtration as previously discussed. Recycled substantially clear liquor is taken from the weir 92 at the top of crystallizer tank 16 and recycled to the absorber, as discussed in connection with FIG. 8. An important advantage of the arrangement in FIG. 9 is that the pump 111 may be of a relatively simple and inexpensive type such as a centrifugal pump because the liquour being pumped by it is substantially clear, i.e. is not in the form of a slurry. In a typical Example of operation of the cooling loop and crystallizer of FIG. 9 the feed 110 from the absorber is at a temperature of 71° C. This feed is cooled by the feed 116 from the crystallizer tank which in this representative Example is at 43° C. The volume ratio between the feed 116 and feed 110 from the absorber is relatively high, e.g. 6:1, so that substantial cooling of feed 110 occurs before the liquor reaches heat exchanger 104. In this Example the temperature of the liquor into the heat exchanger 104 is about 49° C. and drops to 43° C. beyond the heat exchanger. Because of the dilution of feed 110 by the cooler feed 116, a relatively smaller temperature drop across the heat exchanger can be used while a relatively large flow of liquor is nonetheless processed through the cooling loop. Among other things this reduces the amount of cooling surface required at the heat exchanger. The heat exchanger 104 is shown in greater detail in FIG. 10. The liquor to be cooled is passed through a plurality of tubes 120 provided in a cooling bath where the cooling water enters at 122 and exits at 124. The cooling surfaces of tubes 120 which contact the liquor being cooled are preferably comprised of a material which has very low (or substantially lacks) adherence to sulfur which may otherwise tend to precipitate on the tube cooling surfaces. Such tubes can for example be formed of a polymer which has the indicated low or non-adherence, such as PTFE. Similarly the tubes can be formed of other materials, even metals, the liquor contacting surfaces of which are coated or other wise provided (e.g. via a sleeve) with the substantially non-adherent to sulfur polymer

EXAMPLES

In the following Examples, the effects of adding $SO_2$ to the SANS $H_2S$ removal process was tested using a continuous-flow bench scale apparatus. A diagram of the testing apparatus is shown in FIG. 1. Except as otherwise noted, pure $H_2S$ gas is mixed with pure $CO_2$ gas and the mixture is injected at the bottom of the absorber which in the arrangement shown was a 1.0 inch inner diameter column packed with approximately 36 inches of Pro-Pak® distillation packing (0.24 inch square grids of 316 stainless steel). The inlet gas pressure is slightly above atmospheric pressure. The scrubbing liquid is introduced at the top of this column and flows down through the packing. The liquid exits the bottom of the column, passes through a plug flow reactor, then flows into the bottom of a liquid-filled vessel which is sparged with air. The liquid exits this oxidizer and goes into a stirred crystallizer vessel where the temperature is reduced. The solution/sulfur slurry then goes to a settler where the solid sulfur falls to the bottom of the vessel and the liquid is drawn off the top, reheated to operating temperature, and pumped up via a flow transducer to the top of the absorber column to repeat the cycle.

The sorbent for these tests consisted of nominally 0.6 M elemental sulfur, 0.4 M decyldimethylamine (ADMA-10, Albemarle Corporation) and 2.0 M 1-phenoxy-2-propanol DOWANOL PPh, Dow Chemical) dissolved in phenyl-o-xylylethane (PXE, Koch Chemical). The liquid flow rate was varied from 25 to 55 mL/min and the liquid inventory was 1500–4000 mL depending on equipment configuration.

Example 1

A long term (44 hour) run was done under typical SANS process operating conditions except with the addition of $SO_2$. The average inlet $H_2S$ concentration was 32.9% and the average inlet $SO_2$ concentration was 10%, producing a total S gas content of 42.9%. The total gas flow rate was 350 cc/min. The liquid flow rate was 55 cc/min, and the average liquid inventory was 4000 mL. These conditions were maintained for 44 hours, during which time the average $H_2S$ removal was 99.7%. This average removal is significantly better than that observed in a number of other runs done with 42.9% inlet $H_2S$ but no $SO_2$, for which the usual average removal is about 95%. During this run the sulfur oxyanion byproduct make rate was 1.92% (total moles sulfur in oxyanion byproducts per mole sulfur absorbed). The major sulfur oxyanion was sulfate. No other peaks which could have indicated other anionic byproducts were seen in the ion chromatograms used to analyze for sulfate and thiosulfate.

A significantly lower than normal amine degradation rate of 0.28% (mole amine degraded per mole sulfur absorbed) was also observed in this run with $SO_2$ than previously observed in runs done with no $SO_2$, typically 1.0% (mole amine degraded per mole sulfur absorbed). The solid sulfur produced by the process during the run was rinsed, dried and weighed, showing a yield of 522 g. This compares extremely well to the sum of the total sulfur introduced to the absorber as $H_2S$ (404 g as S) and as $SO_2$ (123 g as S), or 527 g S added per gas measurements.

Example 2

For this run, the inlet concentration of $H_2S$ to the absorber was reduced from its normal value of 42.9% to 21.5% and the liquid flow rate was also reduced by approximately a factor of two from 55 cc/min to 25 cc/min, with no $SO_2$ added to the system. This produced conditions in which the removal of $H_2S$ by the SANS sorbent is approaching equilibrium control and as a consequence the $H_2S$ removal was only 64%. At this point, adding 2.0% $SO_2$ to the gas stream and maintaining the same total sulfur concentration in the gas produced an $H_2S$ removal of 72%. Similarly, adding 4.0% $SO_2$ increased the $H_2S$ removal to 80%, and adding 6.0% $SO_2$ gave a removal of 90% of the $H_2S$. At this point, when the $SO_2$ flow was turned off (without increasing the $H_2S$ inlet to compensate), the $H_2S$ removal decreased to a value of 59.4%, consistent with the low removal noted before starting $SO_2$ flow, adjusted for the somewhat lower $H_2S$ concentration.

Example 3

To determine if the direct reaction of $H_2S$ with $SO_2$ occurs to an appreciable extent in this system, the bench scale unit was run under similar conditions to those in Example 2 except that the initial sorbent did not contain any elemental sulfur. At an average inlet $H_2S$ concentration of 22%, $SO_2$ concentration of 6%, and liquid flow rate of 25 mL/min, the outlet $H_2S$ concentration was initially 10%, a removal of only 52%.

The removal improved somewhat with time, probably due to the formation of some elemental sulfur either by the direct reaction of $H_2S$ with $SO_2$ or by air oxidation of sulfide in the oxidizer. Clearly, however, the direct reaction of $H_2S$ with $SO_2$ is not as facile as the reaction mediated by elemental sulfur, which evidently proceeds via the intermediate polysulfide formed by reaction of $H_2S$ and $S_8$ in solution.

Example 4

The conditions were similar to Example 2 except that a higher gas flow rate was used (1075 cc/min) and thus the inlet $H_2S$ concentration was decreased to about 7.0%.

The initial solution contained 0.6 M (as S) elemental sulfur and 0.4 M ADMA-10 in addition to the DOWANOL PPh and PXE components and the nominal liquid flow rate was 25 cc/mm. With no added $SO_2$, the $H_2S$ removal was 32.3%. Keeping the volumetric flow rate of $H_2S$ constant (at 75 cc/min), co-injection of 21 cc/min $SO_2$ (a mole ratio of 3.6:1 $H_2S:SO_2$) resulted in an $H_2S$ removal efficiency increase to 45%. Moving the point of injection of $SO_2$ to just above the lower of the three 12 inch packed columns produced a further increase in $H_2S$ removal to 50%. At this point the $SO_2$ flow rate was increased to give a mole ratio of 2.0:1 $H_2S$ to $SO_2$. The $H_2S$ removal increased to 72.7%. Further increase of the $SO_2$ flow rate to give a 1:1 mole ratio of $H_2S$ to $SO_2$ produced a further increase in $H_2S$ removal to 99%. However, this last step also caused an increase in conductivity of the solution by more than a factor of ten, perhaps indicating that the $SO_2$ was being introduced in excess of stoichiometric.

Example 5

As an illustration of the ability of the reaction to proceed without the addition of oxygen the bench scale unit was modified by removing the oxidizer from the process loop (represented by the dashed line in FIG. 1). In the first run of this type, the plug flow reactor was also removed from the process loop. The sorbent solution was the same as that used in Example 4 except that the ADMA-10 concentration was increased to 0.8 M. The liquid inventory, 1500 mL, was lower than before due to the removal of the vessels. The unit was operated for 6.6 hour using an $H_2S$ flow rate was 75 cc/min (21.3%), $SO_2$ flow rate of 37.5 cc/min for 3.3 hours then 41 cc/min for 3.3 hour and $CO_2$ added to give a total flow rate of 350 cc/min. At the initial $H_2S:SO_2$ ratio of 2.0 the average removal was 99.6%. At the higher $SO_2$ addition rate of 1.83:1 $H_2S:SO_2$ the average removal was 99.96%. After the 6.6 hour run duration the $CO_2$ flow rate was increased to give a total flow rate of 528 cc/min and inlet $H_2S$ concentration of 14.2%. The $SO_2$ concentration was set to give an $H_2S:SO_2$ mole ratio of 1.9. The process was operated under these conditions for 1.7 hours while producing an $H_2S$ removal efficiency of 99.9%.

Example 6

Some other processes which utilize the reaction of $H_2S$ and $SO_2$ are not able to sustain good removal efficiencies if the $H_2S/SO_2$ mole ratio varies from the optimum value (2.0) for even short periods of time. Laboratory experiments of the $SO_2$-enhanced SANS process have demonstrated that a temporary loss of $SO_2$ feed to the system will not cause an immediate reduction in removal. In fact, as shown with the laboratory data in FIG. 5, it typically takes several hours to observe even a small reduction in $H_2S$ removal when the $SO_2$ feed is shut off during some portions of the testing.

Figure 5:
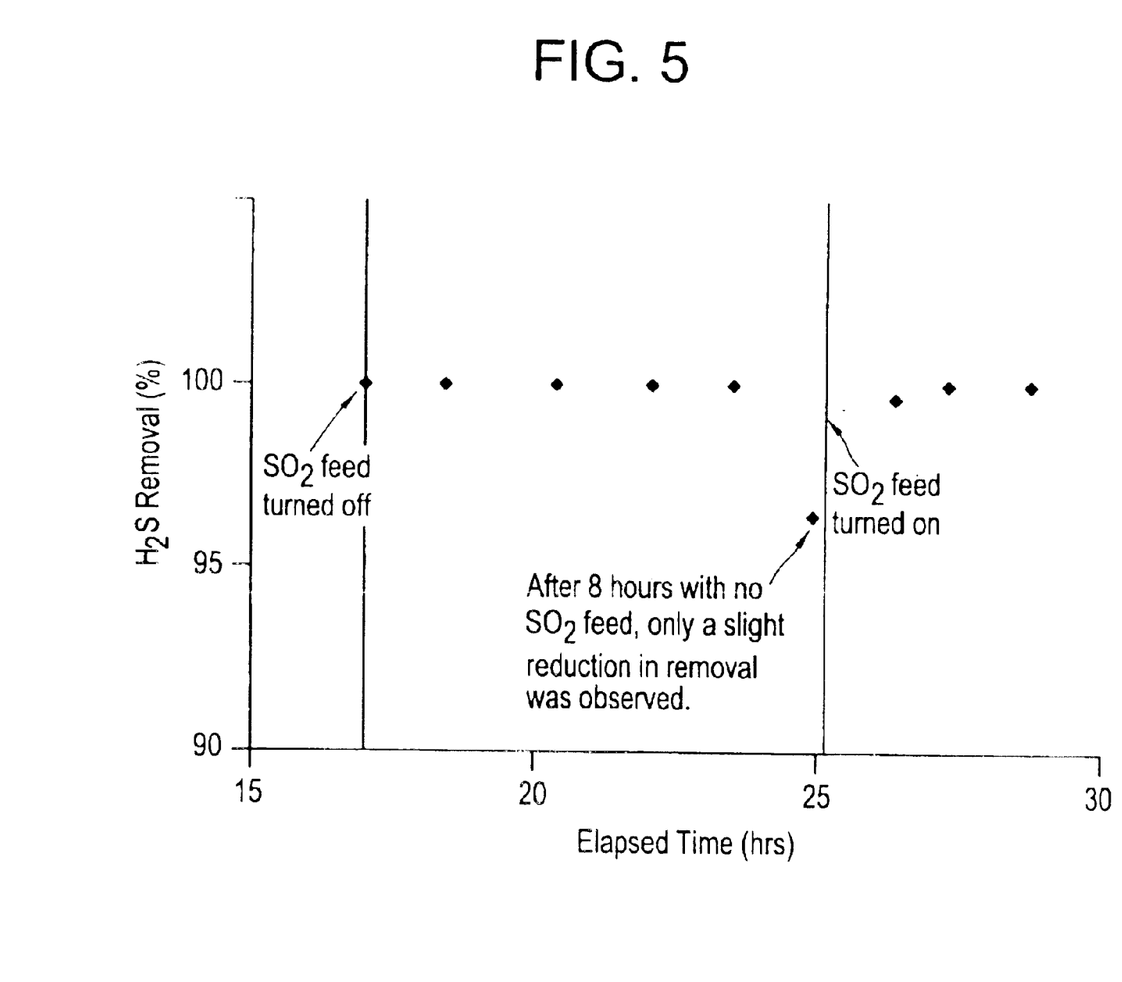
FIG. 5 is a graph illustrating the effects of $SO_2$ extinction on $H_2S$ removal under various laboratory conditions.

This particular test was run with 3.5 L of a sorbent similar in composition to the one in Example 5, nominally 3.2% $H_2S$ and 1.6% $SO_2$ in the inlet gas (balance $CO_2$), using a sparged column followed by a Snyder column both held at 180 F for the absorber. In this particular test, the sorbent had been subjected to an excess of $SO_2$ for six hours prior to turning off the $SO_2$. Roughly 80% of the $H_2S$ reacted during the time period shown in the figure can be attributed to this dose of $SO_2$, while the remaining 20% can be associated with the decrease in thiosulfate concentration from 0.049 M to 0.015 M during the time that the $SO_2$ was turned off.

Thus the sorbent has a buffering capacity in that it evidently can maintain a large concentration of dissolved and complexed $SO_2$ along with thiosulfate and other intermediates which can react with $H_2S$ even in the absence of $SO_2$ in the gas phase. This allows the system to continue achieving good removal even without the addition of $SO_2$ for significant periods of time. Similar buffering effects were noted during the pilot plant testing described below.

Example 7

The $SO_2$-enhanced SANS process described here was operated at a pilot unit located in the Permian Basin of west Texas. This pilot unit processes a slipstream of a 300 psig sour $CO_2$ stream from enhanced oil recovery operations. Design flow through the pilot unit is 0.1 to 1.0 MMscfd with sulfur production of 20 to 200 pounds per day. The sour gas contains 1800 ppmv $H_2S$ along with approximately 80% $CO_2$ and 10 to 11% methane, with the remainder being heavier hydrocarbons (including a relatively high level of aromatic compounds). Since there is no $SO_2$ in the inlet gas, $SO_2$ was supplied to the process by pumping liquid $SO_2$ from an $SO_2$ cylinder. The process was operated essentially as shown in FIG. 2 except that the $SO_2$ was injected into one of three places: directly into the absorber, into the lean solvent stream, or into the inlet gas for testing purposes. Results were essentially independent of the location of $SO_2$ injection.

The pilot unit was able to consistently reduce the $H_2S$ content of the inlet gas from 1800 ppm to approximately 25 ppm, far exceeding the removal specification for the host site (100 ppm $H_2S$ in the sweet gas). The pilot unit was operated for 1550 hours with no chemical addition. The concentration of the tertiary amine and solubilizer decreased only slightly. The measured chemical costs during this period were on the order of $250/long ton of sulfur (LTS), corresponding to a loss of approximately 0.011 gmole amine/gmole $H_2S$ removed. This is considerably lower than other aqueous based technologies on both the pilot and commercial level. The pilot and commercial chemical losses reported in the literature for one common aqueous iron liquid redox technology are $2000/LTS and $500 to $700/LTS, respectively. The amine loss includes both chemical degradation and volatilization.

Only a limited amount of the absorbed $H_2S$ was converted to byproducts during the operation of the $SO_2$-enhanced process at the pilot plant. The byproduct build up in the pilot unit was less than 0.2% mole byproduct/mole $H_2S$ reacted. In comparison, 2 to 4% is typically considered a manageable cost for most applications.

Figure 6:
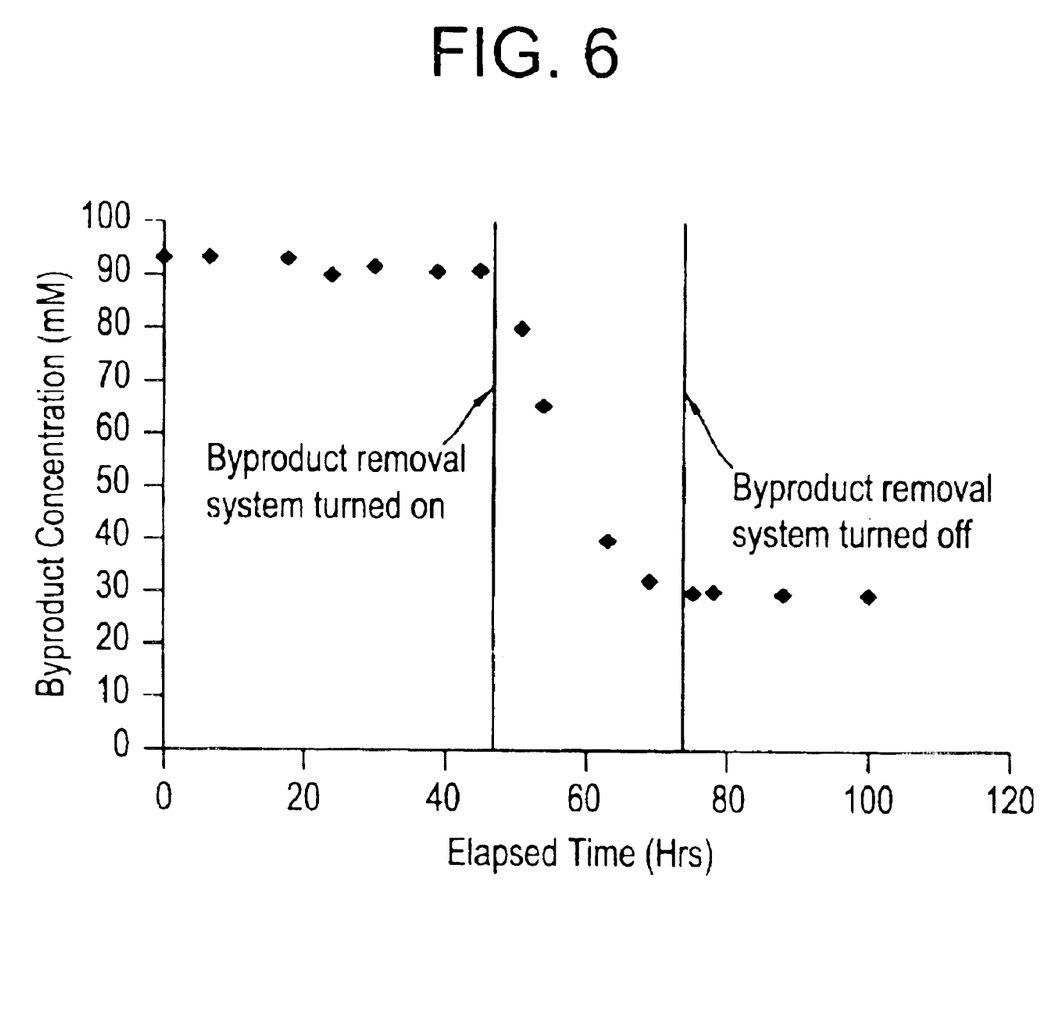
FIG. 6 is a graph illustrating the effects of operating the byproducts removal feature in a system in accordance with the invention.

The ammonia addition approach for on-line removal of the byproducts was successfully demonstrated at the pilot plant. A slipstream of the SANS sorbent was sent to a separate tank and ammonia was added to precipitate the solid ammonium solid salts. The slipstream was pumped through a filter to remove the precipitated salts and then returned to the main solution stream. Using this method, byproduct levels were controlled while operating the unit, and solution purging was not required. Results of operating the byproduct removal system are shown in FIG. 6. During testing with $SO_2$ addition, it was only necessary to operate the salts removal system three times (4% of the total elapsed run time).

Figure 7:
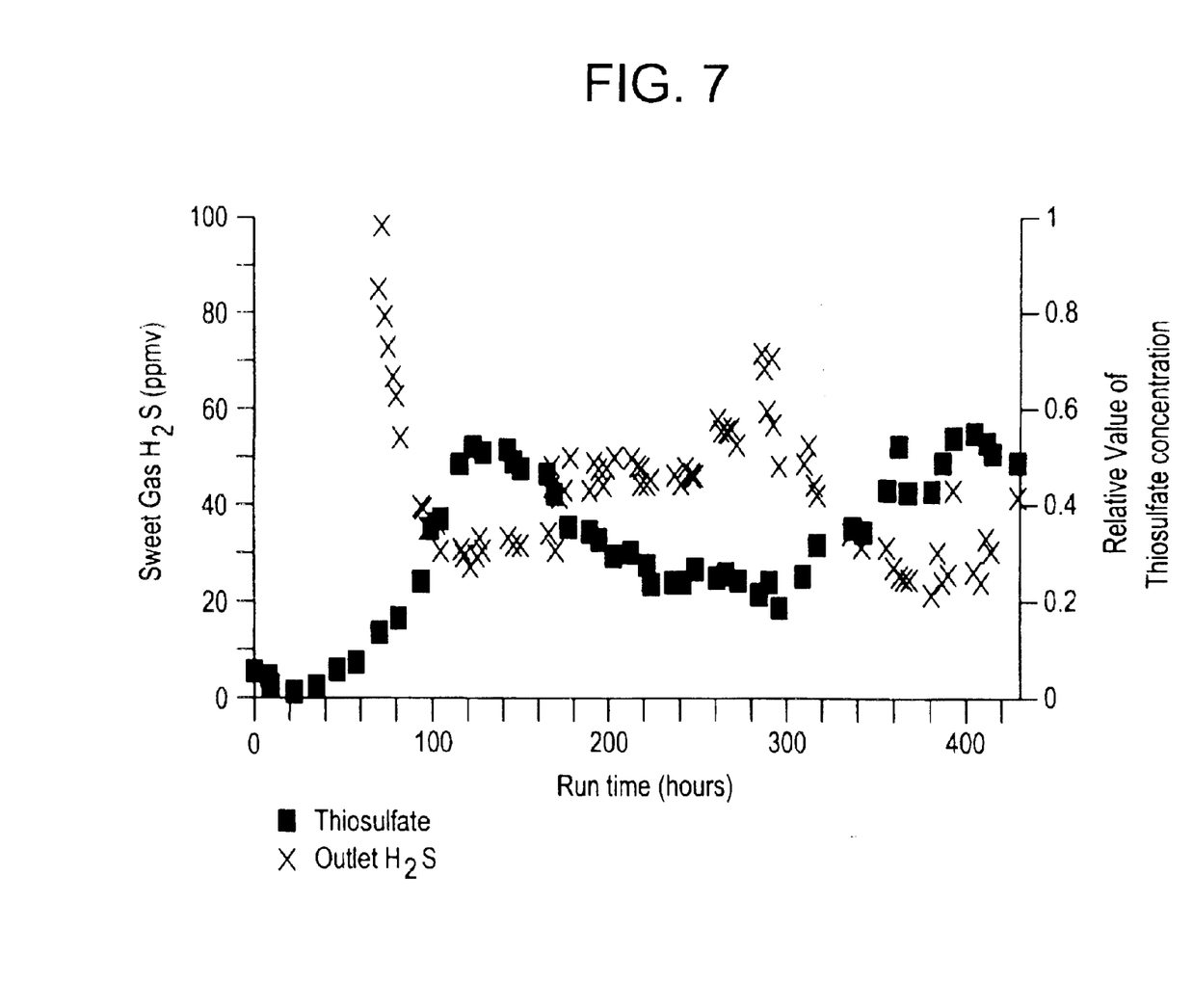
FIG. 7 is a graph showing the effects upon $H_2S$ removal achieved by adjusting the $SO_2$ input in a system in accordance with the invention so as to achieve a specified concentration of thiosulfate.

It was observed during pilot unit testing that $H_2S$ removal was correlated with the thiosulfate concentration in solution and that the $H_2S$ removal could be adjusted by setting the $SO_2$ input so as to achieve a certain concentration of thiosulfate. An example of this phenomenon is shown in FIG. 7. As the thiosulfate concentration was increased, the $H_2S$ concentration in the outlet gas decreased proportionally. Such a control technique is a unique and significant benefit for commercial applications.

While the present invention has been set forth in terms of specific embodiments thereof, it is to be understood in view of the present disclosure that numerous variations upon the invention are now enabled to those skilled in the art, which variations are yet within the teachings of the invention. Accordingly the invention is to be broadly construed, and limited only by the scope and spirit of the claims now appended hereto.

What is claimed is:

1. A process for removing $H_2S$ from a gaseous stream, by the steps of:
    (a) flowing the gaseous stream through an absorber vessel whereat said stream is contacted with a sorbing liquor comprising a nonaqueous solvent containing dissolved sulfur, a base consisting essentially of a tertiary amine having sufficient strength and concentration to drive the reaction between $H_2S$ sorbed by said liquor and said dissolved sulfur to form a nonvolatile polysulfide which is soluble in the sorbing liquor, and a solubilizing agent for maintaining the solubility of polysulfide intermediates which may otherwise separate during the process;
    (b) converting the dissolved nonvolatile polysulfide in said sorbing liquor to sulfur which remains dissolved in said liquor by contacting the liquor with an oxidizing gas comprising sulfur dioxide;
    (c) cooling said sorbing liquor following said oxidation of said polysulfide to a temperature at which the liquor is at or above saturation with respect to said dissolved sulfur;
    (d) converting at least part of the dissolved sulfur in the liquor from step (c) to solid particulate sulfur at a point downstream of the absorber vessel; and
    (e) separating said solid sulfur from step (d) from the liquor.

2. A process in accordance with claim 1, in which step (d) is at least partially conducted in a crystallizer tank and wherein the sorbing liquor in step (c) is cooled in a heat exchanger - containing cooling loop which is connected to said crystallizer tank.

3. A process in accordance with claim 1 in which the sorbing liquor cooled in step (c) has an initial temperature of up to 85° C.

4. A process in accordance with claim 3 wherein the liquor is cooled in step (c) by from 5° to 60° C.

5. A process in accordance with claim 4, wherein the cooling loop includes a heat exchanger wherein the cooling surfaces contacting the liquor being cooled comprises a polymer which resists adherence of sulfur particles which form or are present in the flow of liquor through the heat exchanger.

6. A process in accordance with claim 5, wherein the sorbing liquor from step (b) is pumped into the cooling loop upstream of said heat exchanger and the cooled flow from said heat exchanger is pumped to said crystallizer tank.

7. A process in accordance with claim 6, wherein said crystallizer tank includes a lower settling zone for a slurry of precipitated sulfur particles, and an upper clear zone containing substantially clear sorbing liquor.

8. A process in accordance with claim 7, wherein clear liquor taken from said upper zone of said crystallizer tank is merged at the cooling loop with the liquor from step (b) to partially cool the liquor from step (b) upstream of said heat exchanger.

9. A process in accordance with claim 8, wherein the output flow from said heat exchanger is substantially clear, but supersaturated with respect to dissolved sulfur, and said flow is returned to the settling zone of said crystallizer tank where it is seeded by sulfur particles to effect precipitation of further sulfur.

10. A process in accordance with claim 9, wherein step (e) is performed by filtering sulfur slurry taken from the lower settling zone of said crystallizer tank.

11. A process in accordance with claim 10, wherein the liquor passing through said heat exchanger is cooled thereat by from 5 to 20° C.

12. A process in accordance with claim 11, wherein the volume of said clear liquor from said crystallizer tank which is merged at the cooling loop with the liquor from step (b) is greater than the volume of liquor from step (b) which is merged at said cooling loop.

13. A process in accordance with claim 1 wherein said sorbing liquor is cooled in step (c) by being pumped through a cooling loop while substantially clear, the cooling in said loop bringing said liquor to a condition of supersaturation with respect to said dissolved sulfur; and wherein the resulting supersaturated clear liquor is taken from said cooling loop and seeded with sulfur crystals to effect step (d).

14. A process in accordance with claim 13, wherein said pumping of said clear liquor through said cooling loop is effected with a centrifugal pump.

15. A process in accordance with claim 13, wherein step (d) is conducted at a zone in a crystallizer tank where said sulfur seeding crystals are present.

* * * * *